United States Patent [19]

Carlson

[11] 4,339,101

[45] Jul. 13, 1982

[54] DEVICE FOR DISPLACING A MEMBER, PRIMARILY A STAGE FOR OPTICAL INSTRUMENTS, IN ARBITRARY DIRECTIONS IN ONE AND THE SAME PLANE

[76] Inventor: Leon Carlson, Lievägen 16, S-183 38 Täby, Sweden

[21] Appl. No.: 224,391

[22] Filed: Jan. 12, 1981

[30] Foreign Application Priority Data

Jan. 22, 1980 [SE] Sweden ............................. 8000491

[51] Int. Cl.³ .................... F16M 11/04; G02B 7/00
[52] U.S. Cl. ................................. 248/178; 350/81
[58] Field of Search ............... 248/178, 122, 424, 477, 248/476, 475 R; 350/81, 484

[56] References Cited

U.S. PATENT DOCUMENTS

| | | | |
|---|---|---|---|
| 3,611,561 | 10/1971 | Dosier | 350/81 X |
| 3,743,904 | 7/1973 | Wiesler | 350/81 X |
| 4,299,440 | 11/1981 | Hodgson | 350/81 |

FOREIGN PATENT DOCUMENTS 2218164 11/1972 Fed. Rep. of Germany ...... 248/178

1252667 11/1971 United Kingdom .

*Primary Examiner*—J. Franklin Foss
*Attorney, Agent, or Firm*—Laff, Whitesel, Conte & Saret

[57] ABSTRACT

A device for displacing a member, primarily a stage for optical instruments, in arbitrary directions in one and the same plane. The member is basically square, and its respective corners are connected to the middle of each side of a surrounding square frame which is supported on one hand by two substantially vertical rods carried by a base, said rods being attached to two diagonally opposite corners of the frame, and on the other hand by additionally two substantially vertical rods, which latter are suspended above the frame and are attached to the remaining opposite corners of the frame. The member is capable of being positively displaced by means of two articulate rods disposed in different directions in the plane of displacement of the member substantially orthogonal to each other. The member is prevented from rotating around an axis orthogonal to the plane of displacement by means of two further rods, both of which are attached to the member and to a rigid component connected to the base by means of a hinge joint.

3 Claims, 1 Drawing Figure

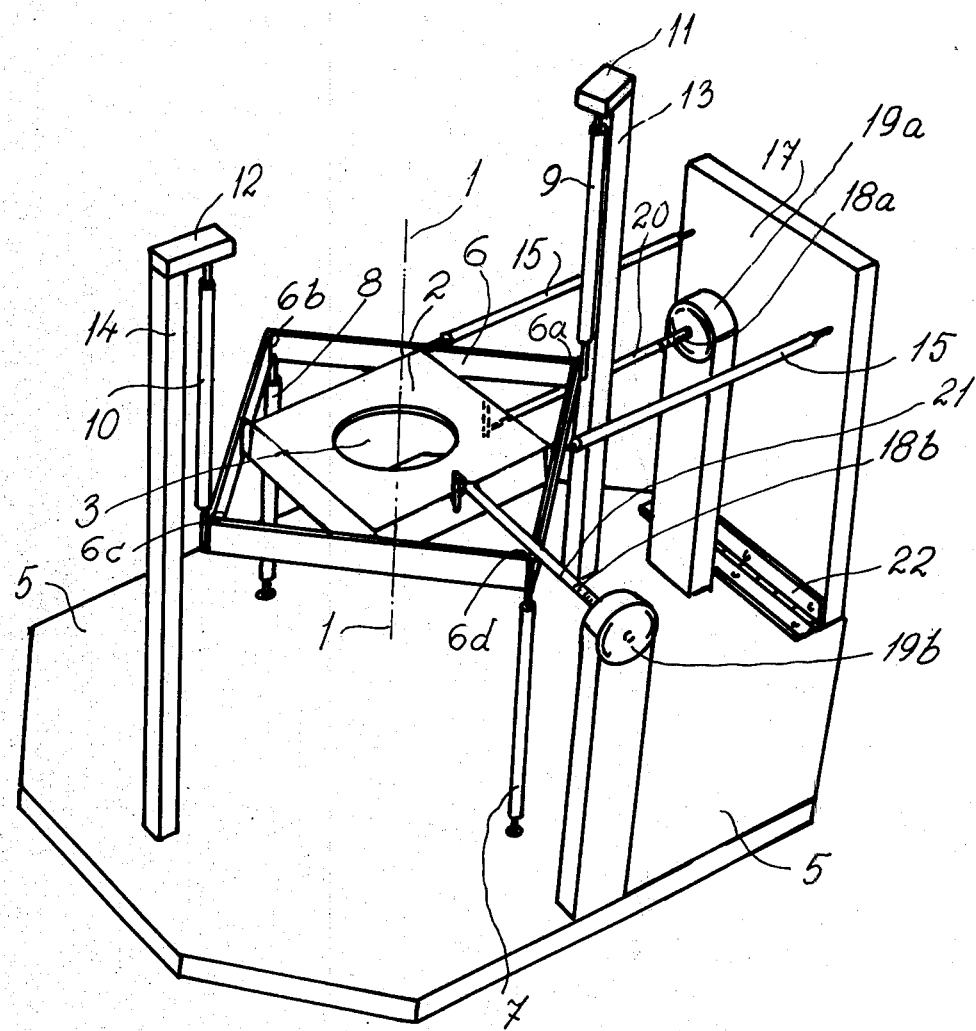

DEVICE FOR DISPLACING A MEMBER, PRIMARILY A STAGE FOR OPTICAL INSTRUMENTS, IN ARBITRARY DIRECTIONS IN ONE AND THE SAME PLANE

BACKGROUND OF THE INVENTION

1. Field of the Invention

This invention refers to a device for displacing a member, primarily a stage for optical instruments, in arbitrary directions in one and the same plane.

2. Description of the Prior Art

British Patent Specification No. 1,252,667 discloses a stage assembly for optical instruments with a stage being movable in two orthogonal directions. The stage is supported by a frame by means of three rigid rods located at the corners of an imaginary triangle and being mutually parallel and orthogonal to the two directions of movement of the stage when the stage is in its quiescent position. One end of each of said rods is articulately connected to the stage and the opposite ends are articulately connected to the frame.

SUMMARY OF THE INVENTION

However, the assembly of the mentioned British Patent Specification has certain drawbacks, viz. that the displacements which can be utilized before the vertical displacement of the stage becomes inacceptably great are quite small (in reality smaller than 1 millimeter) and that different portions of the stage become vertically displaced to different extents.

The present invention has the object of eliminating the above-mentioned drawbacks by providing a stage assembly of the type mentioned by way of introduction wherein the stage is characterized by the features which are disclosed in the accompanying claims.

BRIEF DESCRIPTION OF THE DRAWING

The invention will be described more specifically below with reference to the accompanying drawing which shows a perspective view of the stage disclosed by the invention.

DESCRIPTION OF THE PREFERRED EMBODIMENT

A stage or table 2 is intended to form part of an optical instrument which is not shown in the figure but has the optical axis 1. Said stage 2 is located orthogonally to said optical axis and is provided with an aperture 3, at the center of which a specimen to be studied may be placed by means of an appropriate specimen carrier. The stage 2 is to be capable of being displaced with great accuracy in arbitrary directions in one and the same plane, said plane being orthogonal to axis 1. For this purpose the stage 2 is supported by a frame comprising a base plate 5 and two posts 13 and 14 in the illustrated embodiment, said posts extending substantially vertically from said base plate 5 and each being provided at the upper end with a comparatively short arm 11 and 12, respectively. These arms are substantially orthogonal to said posts and they are directed toward each other and each carry a rod 9 and 10, respectively, the latter being at their opposite ends connected to corners 6a and 6c located diagonally opposite to each other in a square frame 6. The corners of the square stage 2 are secured to the respective centers of each side of the frame 6. Thus, the stage is supported substantially parallel to the base plate 5. The supporting posts 13 and 14 are merely illustrated as examples, and an arbitrary arrangement may be provided to fulfil their functions on the conditions that the rods 9 and 10 are disposed vertically and are at one end attached to the above-mentioned corners of the frame 6 located diagonally with regard to each other.

In addition to the frame 6 being suspended by both of the rods 9 and 10 at each of the corners 6a and 6c it is supported by two rods 7 and 8 which are attached on one hand to the base plate 5 and on the other hand to one each of the diagonally located corners 6b and 6d of the frame 6. All of the rods 7, 8, 9 and 10, respectively, are of the same length, and they are all parallel to the perpendicular of the plane of displacement of the stage when the stage is in its quiescent position.

The intention is that the stage 2 is to be displaceable in such manner that it is moved parallel in one and the same plane (the horizontal plane in the illustrated example) without changing its position with regard to its height to any substantial extent. This displacement is carried out by means of two rods 20, 21, which are articulated at both ends and disposed in different directions in the plane of displacement of the stage (appropriately orthogonally to each other) and may be displaced individually by means of screws 18a and 18b, respectively, which are rotated by means of for example indexing drives 19a and 19b, respectively. The state is prevented from rotating around the axis orthogonal to the plane of displacement by means of for example two articulated rods 15 which are parallel to each other and are of equal length, said rods being attached on one hand to the stage at a finite distance from each other and on the other hand to a rigid plate 17 whose lower portion is attached to the base plate 5 by means of a hinge joint 22, appropriately a leaf spring. If desired, one of said rods 20, 21, in the illustrated case rod 20, may be eliminated by the drive means 18a, 19a being connected to the plate 17 instead. In said displacement the frame 6 will as a result of the manner in which it is clamped be twisted such, that its corners 6a and 6c will be raised upwardly, whereas its corners 6b and 6d will be urged downwardly by the influence of the rods 9 and 10 and the rods 8 and 7, respectively. The elastic deformation of the frame 6 which must occur when the rods 6a and 6c are raised upwardly simultaneously with the rods 6b and 6d being urged downwardly is made possible by the frame 6 being formed of beams having comparatively low torsion rigidity in the vicinity of the corners 6a, 6b, 6c, and 6d, respectively. Contrary to this, the beams of the frame 6 have high bending resistance, particularly in the central areas where the stage 2 is attached to them. These attachments basically comprise rotational joints so that all four corners of stage 2 will follow the positions of the central portions of the beams. The rotational joints may to advantage be embodied as leaf springs, one of which thus will be located at each corner of the stage. As all four of the beams move substantially equally upwards at their one end as compared to downwards at their other end their central portions and therefore all four of the corners of stage 2 will lie substantially at the same height in different positions within a fairly large area of the horizontal plane.

Thus, it may be seen above that the center of the stage will be displaced substantially in one and the same plane when the two screws 18a and 18b are tightened and untightened, respectively. Said screws may to advantage be rotated each by an electric motor so that the displacement of the corresponding rods can be carried out simply by depressing two buttons so as to control the movement of the frame 6 in two directions which for example may be orthogonal to each other. The screws may also be replaced by other positioning means, for example linear indexing drives. The rods 7, 8, 9, and 10 may be of mutually similar type and they may have a comparatively thick main portion which is reduced at the ends or which is attached to a wire-like portion at each end. In this manner both the necessary rigidity and flexibility are achieved.

I claim:

1. A device for displacing a displaceable member in two arbitrary directions in one and the same plane, said device comprising (a) a base,
(b) two support means,
(c) two first rigid elongate members,
(d) two second rigid elongate members, said second rigid elongate members being supported each at one end by said base, (e) a substantially square frame,
(f) two articulate rod members, and
(g) means for preventing said displaceable member from rotating around an axis orthogonal to said plane, said displaceable member being basically square and being circumscribed by said substantially square frame and having each of its corners engaging the central portion of a respective side of the square frame, each of said first rigid elongate members being suspended at one end by a respective one of said support means and being at the other end secured to a respective corner of said square frame, said respective frame corners being located diagonally with regard to each other, each of said second rigid elongate members supporting at the second end a respective remaining corner of said square frame, said remaining corners also being located diagonally with regard to each other, said two first rigid elongate members and said two second rigid elongate members being of equal length and being parallel to the perpendicular of the plane of displacement of the displaceable member when the displaceable member is in quiescent position, and said two articulate rod members being located orthogonally to each other in the plane of displacement of said displaceable member for causing the displaceable member to be displaced.

2. A device as claimed in claim 1, wherein said means for preventing the member from rotating around an axis orthogonal to the plane of displacement comprises two articulate rods and a rigid component, said articulate rods being parallel to each other and being of equal length, said rigid component being connected to said base by means of a hinge joint, said rods being attached each at a respective end to said member at a finite distance from each other and being attached at their remaining ends to said rigid component.

3. A device as claimed in claim 1, wherein said two support means each comprise a post secured to said base.

* * * * *